United States Patent [19]
Chowdhury et al.

[11] Patent Number: 5,954,846
[45] Date of Patent: Sep. 21, 1999

[54] EFFICIENT, REPLACEABLE AIR FILTER SYSTEM FOR MILKING MACHINE PULSATORS

[75] Inventors: Mofazzal H. Chowdhury, Sun Prairie; Rolf W. Reisgies, Waunakee; Stuart Wipperfurth, Madison, all of Wis.

[73] Assignee: Alfa Laval Agri Inc., Waunakee, Wis.

[21] Appl. No.: 08/956,735

[22] Filed: Oct. 23, 1997

[51] Int. Cl.[6] .................................................. B01D 50/00
[52] U.S. Cl. ........................... 55/385.1; 55/497; 55/504; 55/507; 119/14.36
[58] Field of Search .............................. 55/497, 504, 505, 55/506, 507, 508, 509, 490, 495, 503, 385.1; 119/14.36, 14.01; 137/103; 403/329

[56] References Cited

U.S. PATENT DOCUMENTS

| | | |
|---|---|---|
| 1,757,432 | 5/1930 | Kamrath ..................................... 55/505 |
| 3,071,108 | 1/1963 | Nederhood . |
| 3,130,025 | 4/1964 | Bowden et al. .......................... 55/508 |
| 3,183,920 | 5/1965 | Cochran . |
| 3,302,614 | 2/1967 | Karnath . |
| 3,480,038 | 11/1969 | Simons . |
| 3,796,027 | 3/1974 | Gumtow ..................................... 55/504 |
| 4,557,261 | 12/1985 | Rugheimer ........................ 128/202.27 |
| 4,871,455 | 10/1989 | Terhune et al. ........................... 55/507 |

*Primary Examiner*—Jay H. Woo
*Assistant Examiner*—Robert A. Hopkins
*Attorney, Agent, or Firm*—Foley & Lardner

[57] ABSTRACT

A replaceable air filter system for milking machine pulsators has a base with an internal channel that communicates with the air inlet of a milking machine pulsator when the base is mounted on the pulsator. An air filter section is releasably mounted to the base and includes a case, air filter medium attached to the case, and a connector extending from the case which connects to an open bore of the base. The air filter section can be releasably secured to the base. The air filter medium may be formed of multi-fold filter material to provide a large area filter for the input air. When the filter medium is saturated or clogged, an operator can detach the air filter section from the base and replace it with a new air filter section quickly and conveniently.

13 Claims, 4 Drawing Sheets

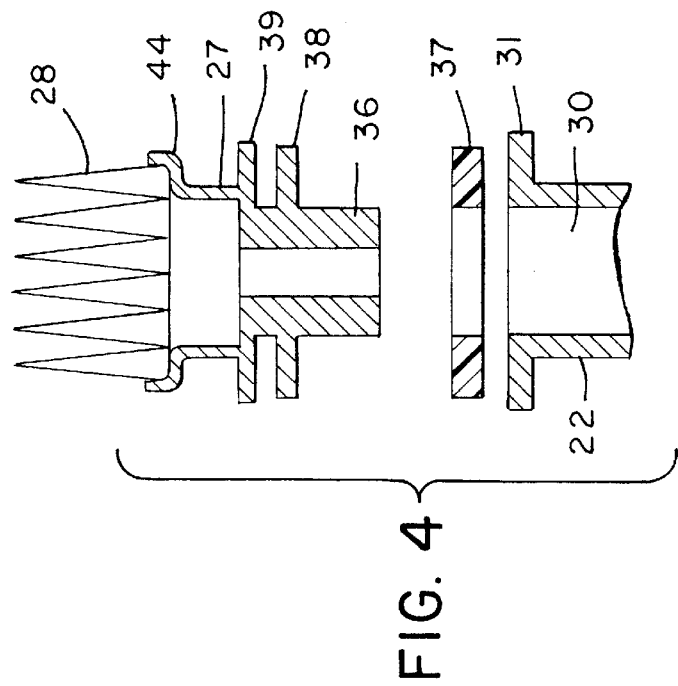
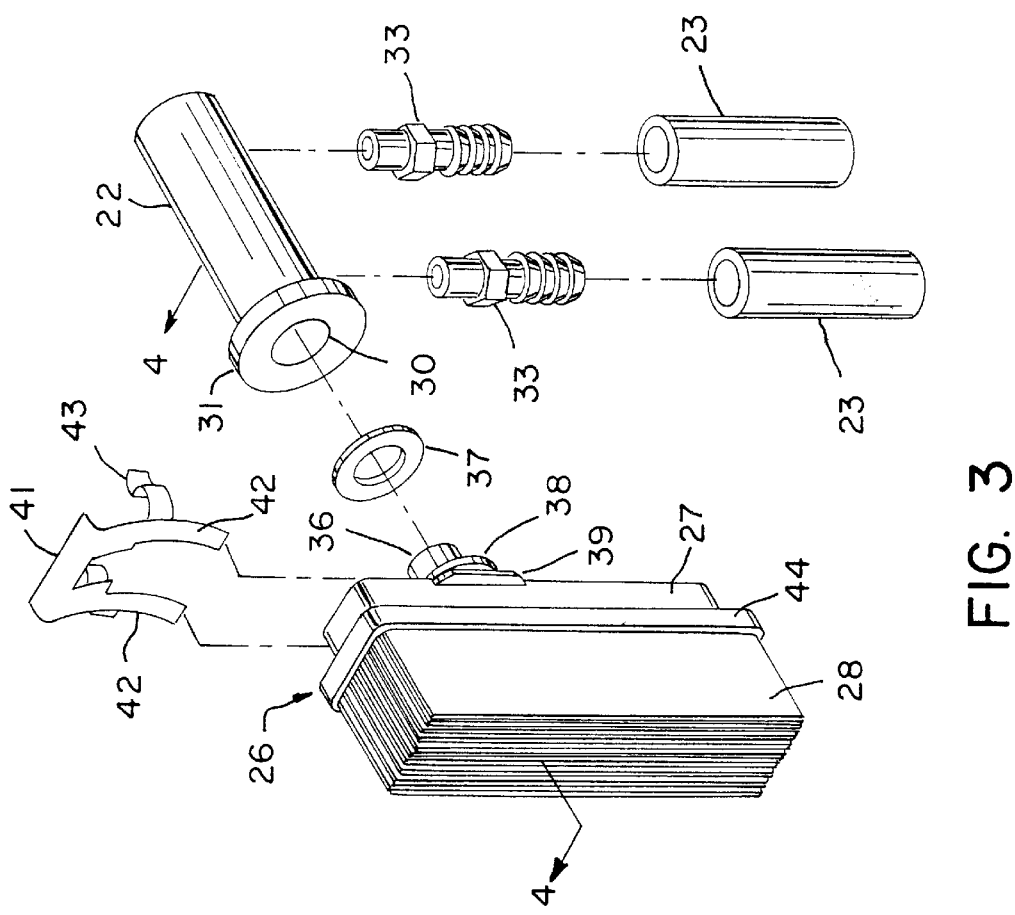
FIG. 4
FIG. 3

EFFICIENT, REPLACEABLE AIR FILTER SYSTEM FOR MILKING MACHINE PULSATORS

FIELD OF THE INVENTION

This invention pertains generally to the field of milking equipment, and particularly to pulsators used with milking machines.

BACKGROUND OF THE INVENTION

In the typical milking machine, a teat cup cluster is attached to the udder of the cow during the milking process. The cluster includes four teat cups, one for each of the four quarters of the cow's udder, with each teat cup including a rigid outer shell, typically made of stainless steel, and a soft rubber or plastic inflation which fits within the shell. The inflation is connected to a line that typically leads to a common receptacle or claw which holds milk drawn from each of the four teat cups. The claw is connected by a hose to a milk line which, during the milking operation, is placed under a constant vacuum draw. The space between the rubber inflation and the metal shell of each teat cup is closed off from the outside atmosphere and is connected by a hose to a pulsator unit (usually through a manifold to which hoses extending to the other teat cups are also connected). The pulsator alternately applies vacuum and ambient air pressure to the hose(s) leading to the teat cups so that the teat cup inflations are opened to the milking vacuum in a pulsed manner to provide the appropriate milking action.

In pipeline milking systems and in modern milking parlors, common vacuum lines extend from a large vacuum pump to the milking stations where cows are milked. A pulsator is typically located at each milking station and is connected to the common vacuum line. When the pulsator switches to release the vacuum on the teat cups, it opens up the hose leading to the teat cups to the outside atmosphere so that the inflations relax and cut off the vacuum from the milk line. This generally results in air being drawn in through the pulsator into the hose leading to the teat cups. A filter or screen is thus typically provided at the air inlet to the pulsator to filter out dust, dirt, flies or other insects, and moisture. Although a modern milking parlor is relatively free of dust and insects, moisture in the air is very common because of the volume of water used for washing the cows during preparation and for washout of the equipment after milking. Where individual filters are used at each pulsator, such filters tend to become clogged or saturated with moisture relatively quickly, requiring frequent cleaning or replacement by the operator if the pulsators are to be maintained in proper working order. As an alternative to having individual filters or screens at each pulsator, many modern milking parlors have a separate ambient air line, mounted adjacent to the vacuum line to which the pulsator is connected, to receive ambient air. The common air line receives air through a large air filter typically located at a position well away from the milking stations at which the cows are being milked. Although the use of a common air line in this manner is effective, it has certain disadvantages, including the cost of installing the common air line and the connecting lines from each pulsator to the common line, space constraints in the milking parlor because of the space occupied by the common air line, some restriction in the free air flow to the pulsators through the main filter and the common air line, and the need to properly maintain the large air filter connected to the common air line. Because air is drawn in through the common air line filter to supply many pulsators, the common air filter can clog or saturate fairly rapidly, and if that air filter is not functioning properly, the performance of all of the pulsators will suffer.

SUMMARY OF THE INVENTION

In accordance with the present invention, a replaceable air filter system is provided for each pulsator in a milking installation, such as a milking parlor, which efficiently removes particulates and moisture from the air drawn into the pulsator, presents minimal restriction to the flow of air into the pulsator, is capable of functioning for an extended period of service, and is easily and quickly replaced by the operator when necessary. The filter system for individual pulsators of the invention eliminates the need for (and thus the cost of and space occupied by) a common ambient air line. The air filter system can be readily retrofit to existing pulsators, including those adapted to be connected to a common ambient air line.

The filter system of the invention includes a base having an internal channel formed to communicate with the air inlet of the pulsator when the base is mounted on the pulsator and extending to an open bore in the base. A replaceable filter section is releasably connected to the base, and includes a case and a connector with a channel extending from the case, which is sized to fit to the base into communication with the open bore of the channel in the base and thus with the pulsator air inlet or inlets, thereby providing communication between the pulsator air inlet(s) and the interior of the case. The case has an open side in which is mounted the filter medium. The filter medium preferably is a multi-fold paper air filter having a filter surface area that is much greater than the area of the open side of the case. A multi-fold filter of this type provides highly efficient filtering of air with minimal restriction of the air drawn through the filter, and, because of the large effective surface area of the filter, has a much longer service life than would a filter which covered just the surface area of the open side of the case.

A connector preferably extending from the case is sized to press fit into an open bore of the internal channel in the base to provide a substantially airtight seal. To further hold the filter section in place on the base, means may be provided for releasably securing the filter section to the base. Such means may take the form of a spring clip which is engaged to a flange extending around the connector on the filter section and into snap fit engagement over the mounting flange extending around the open bore of an adapter body portion of the base.

To protect the filter, a cover may be mounted over the filter section. When the filter section is to be replaced, the operator simply takes off the cover, pulls the spring loaded clip off if a spring clip is used, and then pulls the filter section away from the base, an operation easily accomplished without the use of tools in a few seconds. A new filter section is similarly easily mounted into place by pressing the extending connector from the case into the bore of the channel in the base and reinstalling the spring loaded clip and the cover. A gasket may be mounted around the extending connector and is pressed into engagement with the mounting flange of the adapter body of the base when the filter section is pressed into place onto the base.

Further objects, features and advantages of the invention will be apparent from the following detailed description when taken in conjunction with the accompanying drawings.

BRIEF DESCRIPTION OF THE DRAWINGS

In the drawings:

FIG. 3 is an exploded view of the air filter system of the present invention.

FIG. 4 is a cross-sectional view of the air filter system taken along the lines 4—4 of FIG. 3.

DETAILED DESCRIPTION OF THE INVENTION

Figure 1:
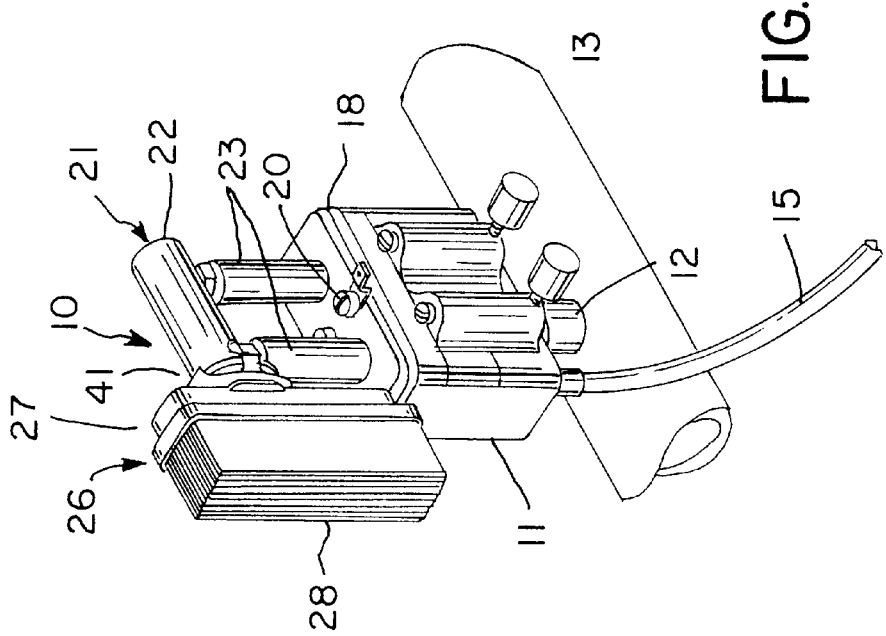
FIG. 1 is a perspective view of the pulsator air filter system of the present invention mounted on a typical pulsator.
Figure 2:
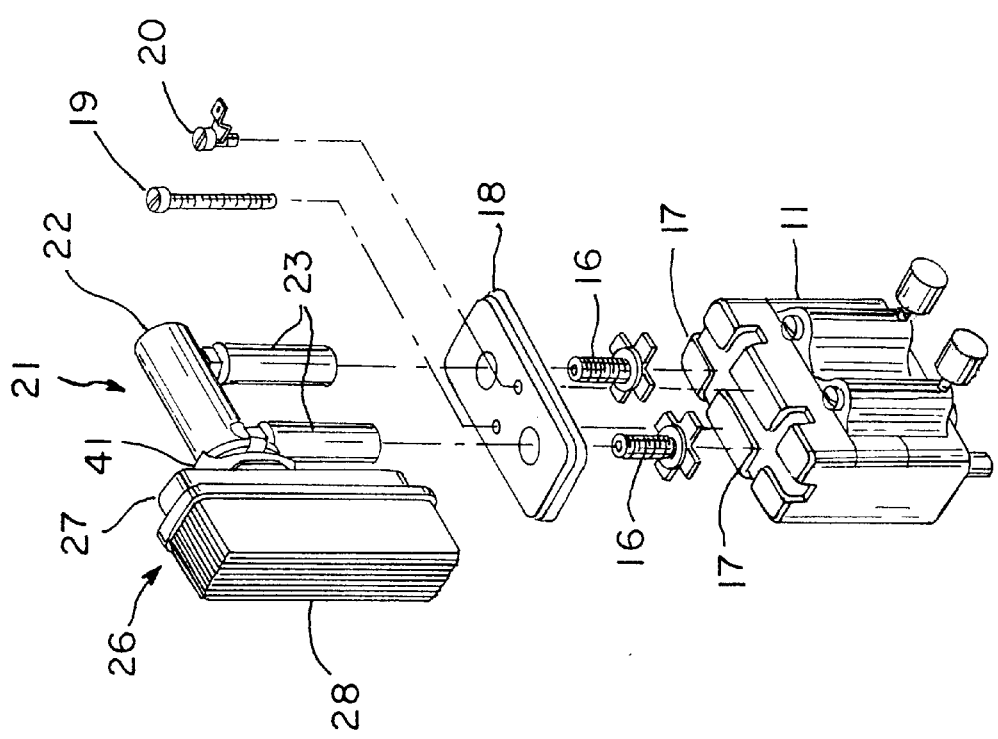
FIG. 2 is an exploded view of the air filter system and pulsator of FIG. 1, showing the manner in which the air filter system is assembled to the pulsator.

With reference to the drawings, the replaceable air filter system of the present invention is shown generally at 10 in FIG. 1 mounted to a standard milking machine pulsator shown at 11. The pulsator 11 is connected by a pipe 12 to a common vacuum line 13 in a conventional manner to receive the vacuum placed on the line 13. The pulsator 11 is connected by a hose 15 to a teat cup cluster (not shown) to provide the alternating vacuum and atmospheric air pressure required for proper milking. The pulsator 11 is of entirely conventional design and any of the various conventional pulsators may be utilized as desired. For purposes of illustration only, the pulsator 11 is shown as having two ambient air inlet connectors 16 each having an internal channel which is placed in communication with an outside air inlet 17 of the pulsator 11, as best illustrated in the exploded view of FIG. 2 wherein the air inlet connectors 16 are shown spaced away from the pulsator 11. The connectors 16 are illustratively shown mounted in place onto the top of the pulsator 11 by a top panel 18 and connecting screws 19 and 20, with the screw 20 also functioning as a contact post by which electrical power can be supplied to the pulsator 11 to operate it.

The air filter system 10 has a base 21 composed of an adapter body 22 from which extend two fittings 23 that are adapted to be engaged over the connectors 16. The fittings 23 may be formed, for example, of plastic (e.g., Tygon™) hose having a hollow bore which is sized to closely match the circumference of the connectors 16 so that the fittings 23 will press fit into airtight engagement over the connectors 16. A filter section 26 is releasably connected to the base 21 and includes a case 27 and a filter medium 28 mounted to an open side of the case 27.

As best shown in the exploded view of FIG. 3, the adapter body 22 has a hollow bore 30 and terminates at an open end surrounded by an outwardly extending flange 31. The fittings 23 are connected to the adapter body 22 by, for example, barbed connectors 33 which press fit into the interior bore of the fittings 23 and extend through holes (not shown in FIG. 3) through the walls of the adapter body 22 so that the fittings 33 are in communication with the interior bore 30 of the adapter body.

The hollow bores of the fittings 23, connectors 33 and the air inlet connectors 16 communicate with the bore 30 of the adapter body to provide an internal channel of the base 21 that is in communication with the air inlets 17 when the base 21 is mounted to the pulsator.

As shown in partial perspective in FIG. 3, and more clearly in cross-section in FIG. 4, a connector 36 with a hollow bore extends from the case 27. The connector 36 has an outer cylindrical periphery which is sized to closely match the internal bore 30 in the adapter body 22 of the base so that the connector 36 can press fit into the bore 30. A gasket 37, for example, formed of foam rubber, is mounted around the connector 36 and is interposed between the mounting flange 31 on the adapter body 22 and a first flange 38 extending outwardly from the base of the connector 36. As also shown in cross-section in FIG. 4, a second flange 39 extends outwardly from the connector 36 spaced away from the flange 38 to define a space between the flanges 38 and 39. A spring-loaded clip 41 generally having a U-shape with extending legs 42 and lateral spring arms 43, can be used to help releasably attach the filter section to the adapter body of the base when the spring legs 42 are inserted into the gap between the two flanges 38 and 39 and the spring arms 43 are engaged over the flange 31 on the adapter body.

The filter medium 28 is preferably a multi-fold paper filter similar to air filters for air intakes of internal combustion engines. A suitable filter medium is a FRAM BA6591 filter produced by Allied Signal Corp. To hold the filter medium 28 in place, the case 27 preferably has an outwardly extending rim 44 surrounding the open side of the case into which the peripheral edges of the filter medium 28 may be engaged and by which they may be secured to the rim 44, for example, by an adhesive.

When the filter medium 28 has become clogged or saturated or is otherwise in condition to be replaced, the operator simply pulls the spring clip 41 upwardly to detach it from both the filter section 26 and the base 21. The operator then pulls the filter section away from the base 21 to pull the connector 36 out of the bore 30 of the adapter body of the base. The operator then inserts a new filter section 26 in place by pressing the connector 36 of the new filter section into the bore 30 of the adapter body, and reattaches the spring clip 41 by engaging the legs 42 of the spring clip between the flanges 38 and 39 and engaging the arms 43 of the spring clip over the flange 31.

The filter section 26 preferably has an elongated rectangular shape illustrated in the figures, with the connector 36 being positioned with regard to the rectangular case 27 nearer one of the ends of the case than the other. However, the shape of the filter section 26 and the case 27 may be circular, square or another shape as desired. The preferred rectangular shape of the case 27 allows the operator to adapt the position of the filter section to best fit the space available adjacent to the pulsator. For example, if the position of the filter section 26 with respect to the pulsator 11 as shown in FIG. 1 is not suitable because the bottom end of the filter section may be too close to other components of the milking system (not shown in FIG. 1), then the entire filter section 26 may be rotated about the connector 36 to a position where, for example, the filter section 26 is oriented horizontally, or to a position wherein the longer side of the rectangular filter section 26 extends upwardly from the base 21 rather than downwardly as shown in FIG. 1.

Figures 5, 6:
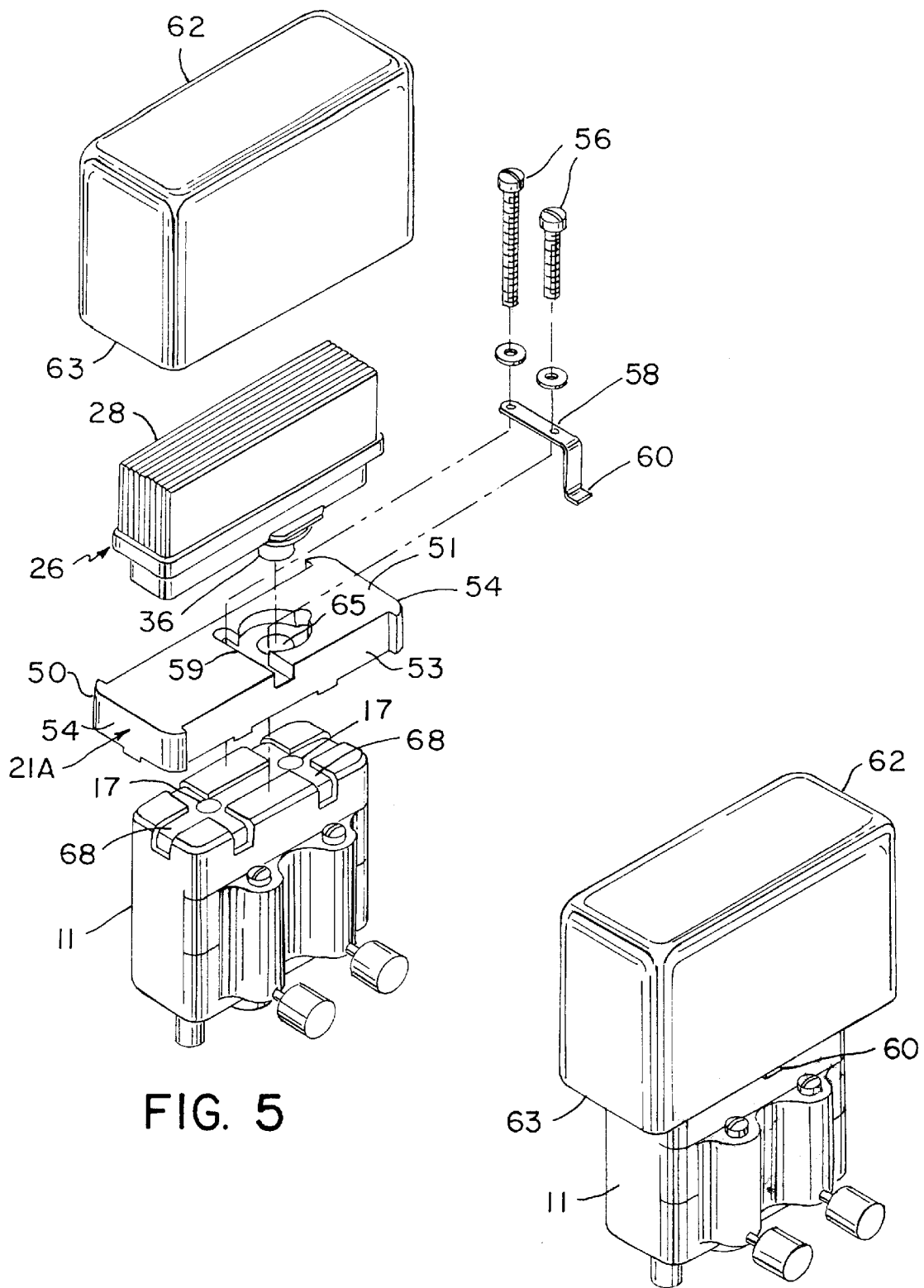
FIG. 5 is an exploded view of the air filter system of the invention with a modified base construction.
FIG. 6 is a perspective view of the air filter system of FIG. 5 as mounted on a pulsator with a protective cover in place.

An air filter system in accordance with the invention having a modified base is shown in FIG. 5 in an exploded view that illustrates the mounting of the air filter system onto a pulsator 11. The air filter system of FIG. 5 includes a filter section 26 which may be constructed in the same manner as the air filter section 26 of FIGS. 1–4. The air filter system of FIG. 5 has a modified base 21A for interfacing the filter section 26 to the pulsator 11. The base 21A is formed of a one-piece base adapter body 50 made, for example, of a semi-rigid rubber, with a top side 51, a bottom side 52, lateral sides 53 and ends 54. As discussed further below, the base adapter body 50 has openings formed therein which define an internal channel through the base 21A from the top side 51 to the bottom side 52 to direct filtered air from the filter section 26 through the base 21A to the air inlet 17 of the pulsator 11. The base 21A is secured to the top of the pulsator 11 by, for example, two screws 56 which thread through holes in the adapter body and into corresponding threaded holes in the top of the pulsator 11. The screws 56 may also be utilized to attach a metal bridge section 58 to the adapter body 50, with a horizontal section of the bridge 58 fitting into a groove 59 in the adapter body and with a tab section 60 of the bridge 58 extending outwardly when the bridge is secured in place. A cover 62, which may be formed of a durable material such as nylon, forms an enclosure with an open bottom around a bottom rim 63 and fits over the filter section 26 to protect the filter medium 28. FIG. 6 shows the assembled filter system with the cover 62 in place and engaged at its bottom edge 63 with the extending tab 60 of the bridge 58 so as to hold the cover 62 in its proper position with the top wall of the cover 62 spaced above the top of the filter medium 28 to allow air to flow around the filter medium.

When the filter section 26 is to be replaced, the operator simply pulls the cover 62 upwardly, then pulls the used filter section 26 upwardly and away from the adapter body 50 of the base 21A, inserts a new filter section 26 in its place and replaces the cover 62.

Figure 7:
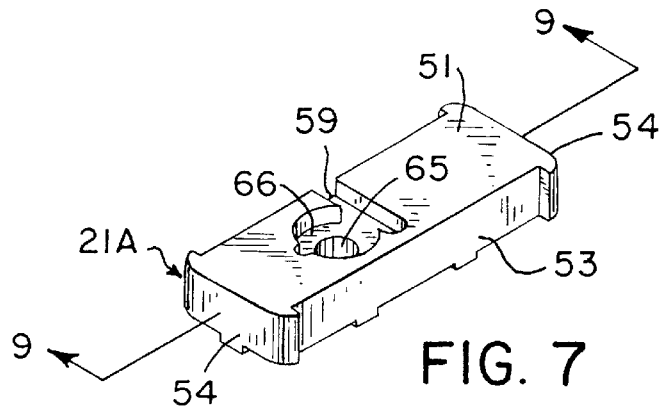
FIG. 7 is a perspective view of the base of the air filter system of FIG. 5.
Figure 8:
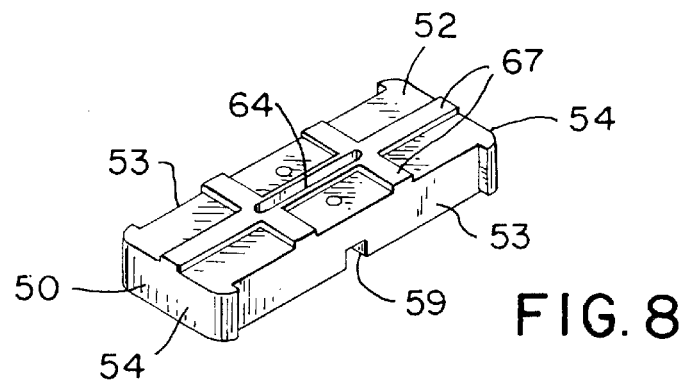
FIG. 8 is a perspective view of the base of FIG. 7 showing the bottom side thereof.
Figure 9:
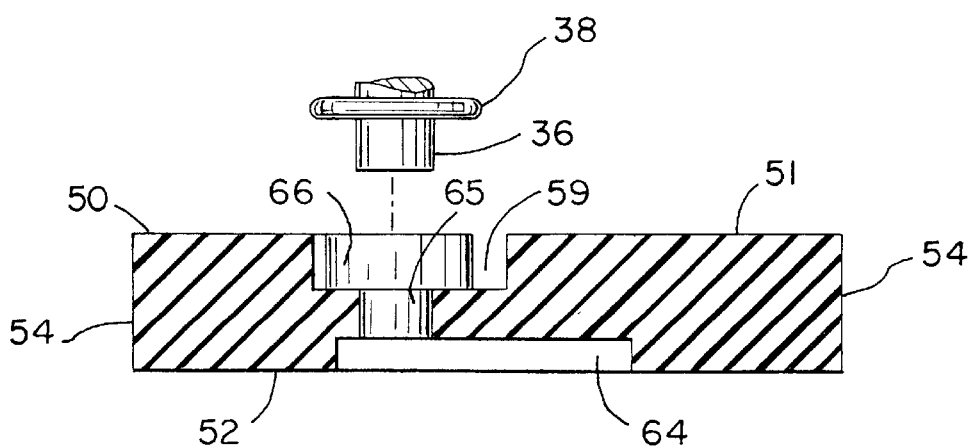
FIG. 9 is a cross-sectional view of the base taken along the lines 9—9 of FIG. 7.

More detailed views of the base 21A are shown in FIGS. 7–9. As illustrated therein, the lateral sides 53 of the adapter body of the base are indented so as to be spaced away from the walls of the cover 62 when the cover is in place to allow air to flow between the lateral walls 53 and the internal surfaces of the cover 62 and thence through the filter medium 28. A channel is formed through the adapter body 50 from the top side 51 to the bottom side 52 by a grooved channel 64 which, when the base 21A is mounted on the pulsator 11, extends over and is in communication with the fresh air inlet 17 of the pulsator 11. In addition, the internal channel in the base is defined by a bore 65 which extends upwardly from the grooved channel 64 and which is adapted to receive and firmly engage the connector 36 that extends from the filter section 26. A recess 66 is preferably also formed in the body 50 surrounding the bore 65 to receive the flange 38 of the filter section 26, to thereby better hold the filter section in place on the base 21A. The channel through the base thus defined by the groove 64 and the bore 65 provides communication between the interior of the case of the filter section 26 and the fresh air inlet 17 of the pulsator 11 when the base is mounted on the pulsator. As illustrated in FIG. 8, the bottom side 52 of the adapter body 50 may include raised sections 67 which correspond to grooves 68 in the pulsator 11 (best shown in FIG. 5), so that the base 21A fits tightly in place onto the top of the pulsator 11 and provides a sealing engagement to the base around the air inlet 17 so that air is provided to these inlets substantially only after passing through the filter medium 28.

It is understood that the invention is not confined to the particular embodiments set forth herein as illustrative, but embraces all such modified forms thereof as come within the scope of the following claims.

What is claimed is:

1. A replaceable air filter system for a milking machine pulsator with an outside air intake comprising:

(a) a base having an internal channel formed to communicate with the air inlet of the pulsator when the base is mounted on the pulsator, the internal channel extending to an open bore; and (b) a filter section attachable to the base, having a case with an open side, filter medium mounted in the open side of the case to close off an interior of the case, the filter medium comprised of multi-fold filter material, and a connector extending between the case and to the open bore of the base when the filter section is mounted to the base to place the internal channel of the base into communication with the interior of the case, wherein the base has an adapter body, the open bore of the base is formed in the adapter body, and a mounting flange formed on the adapter body about the open bore in the adapter body, spaced flanges formed adjacent the connector extending from the case of the filter section, and a spring loaded clip formed to engage between the spaced flanges on the connector extending from the case and to engage the mounting flange on the adapter body to secure the filter section to the adapter body when the clip is in place and to allow release of the filter section from the adapter body when the clip is pulled off of engagement with the flanges about the connector extending from the case and the mounting flange on the adapter body.

2. The air filter system of claim 1 wherein the connector is cylindrical and is formed with and extends outwardly from the case of the filter section, and wherein the open bore in the base is sized to receive the cylindrical connector with a press fit.

3. A replaceable air filter system for a milking machine pulsator with an outside air intake comprising:

(a) a base mounted to the milking machine pulsator and having an internal channel formed to communicate with the air inlet of the pulsator, the internal channel extending from the outside air intake of the pulsator to an open bore of the base; and (b) a filter section attachable to the base, having a case with an open side, wherein the case of the filter section is rectangular in form, filter medium mounted in the open side of the case to close off an interior of the case, the filter medium comprised of multi-fold filter material secured to the case at peripheral edges of the multi-fold filter material to close off the interior of the case, and a connector extending between the case and to the open bore of the base when the filter section is mounted to the base to place the internal channel of the base into communication with the interior of the case.

4. The air filter system of claim 3 further comprising means for releasably securing the filter section to the base.

5. The air filter system of claim 4 wherein the base has an adapter body, the open bore of the base is formed in the adaptor body, and the means for releasably securing the filter section to the base comprises a mounting flange formed on an adapter body about the open bore in the adapter body, spaced flanges formed adjacent the connector extending from the case of the filter section, and a spring loaded clip formed to engage between the spaced flanges on the connector extending from the case and to engage the mounting flange on the adapter body to secure the filter section to the adapter body when the clip is in place and to allow release of the filter section from the adapter body when the clip is pulled off of engagement with the flanges about the connector extending from the case and the mounting flange on the adapter body.

6. The air filter system of claim 3 wherein the connector extends from the case at a position more closely adjacent to one of the ends of the case than the other.

7. The air filter system of claim 3 wherein the case includes a rim extending outwardly from the rest of the case and wherein the filter medium is adhered to the rim of the case with adhesive.

8. The air filter system of claim 3 the base has an adapter body with a hollow bore with a closed end and an open end and a fitting comprising a cylindrical hollow tube which is connected through a wall of the adapter body into communication with the hollow bore of the adapter body.

9. The air filter system of claim 8 wherein the connector extending between the case of the filter section and the base is cylindrical and is sized to press fit within the hollow bore of the adapter body at the open end of the adapter body.

10. The air filter system of claim 8 wherein there are two fittings connected to the adapter body to be in communication with the bore therein, the two fittings connectible to two air intake openings of a pulsator.

11. The air filter system of claim 3 further including a cover open on one side to fit over the filter section to protect the filter medium while allowing air to flow in between the cover and the case of the filter section and thence through the filter medium.

12. The air filter system of claim 3 wherein the base is formed of a one-piece adapter body with a bottom side and a top side, and wherein the internal channel in the base includes a channel in the bottom side formed to extend over an air inlet of the pulsator when the base is mounted on the pulsator and a bore through the adapter body from the channel in the bottom side to the top side of the adapter body and which is formed to receive the connector between the filter section and the base.

13. The air filter system of claim 12 wherein the base adapter body is formed in one-piece of rubber.

* * * * *